A. C. HAMILTON.
RADIATOR FOR MOTOR VEHICLES.
APPLICATION FILED APR. 17, 1918.
1,352,190.
Patented Sept. 7, 1920.
2 SHEETS—SHEET 1.
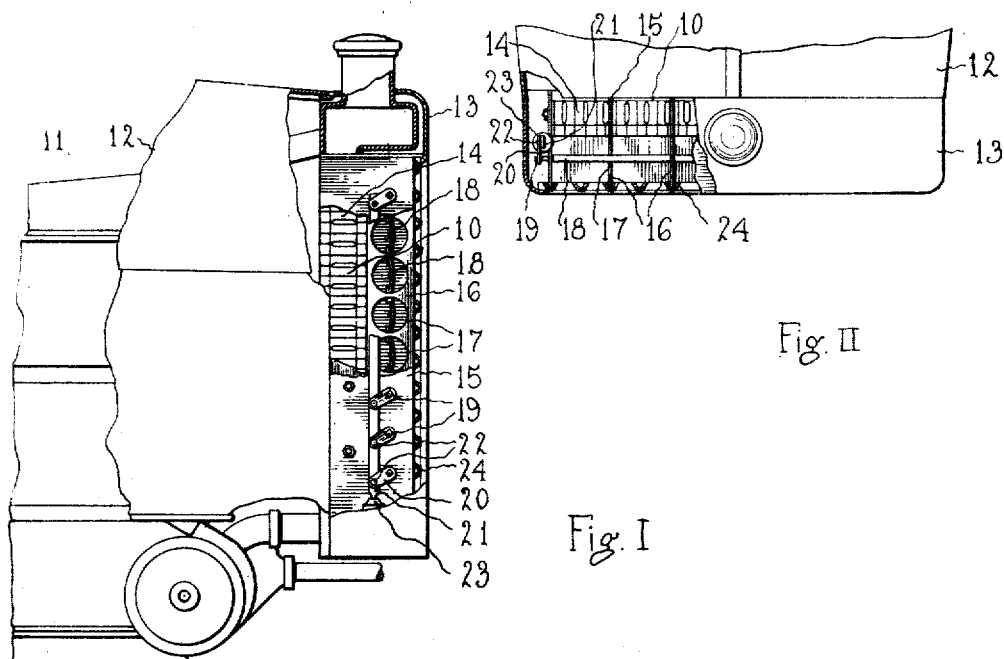
Fig. I
Fig. II
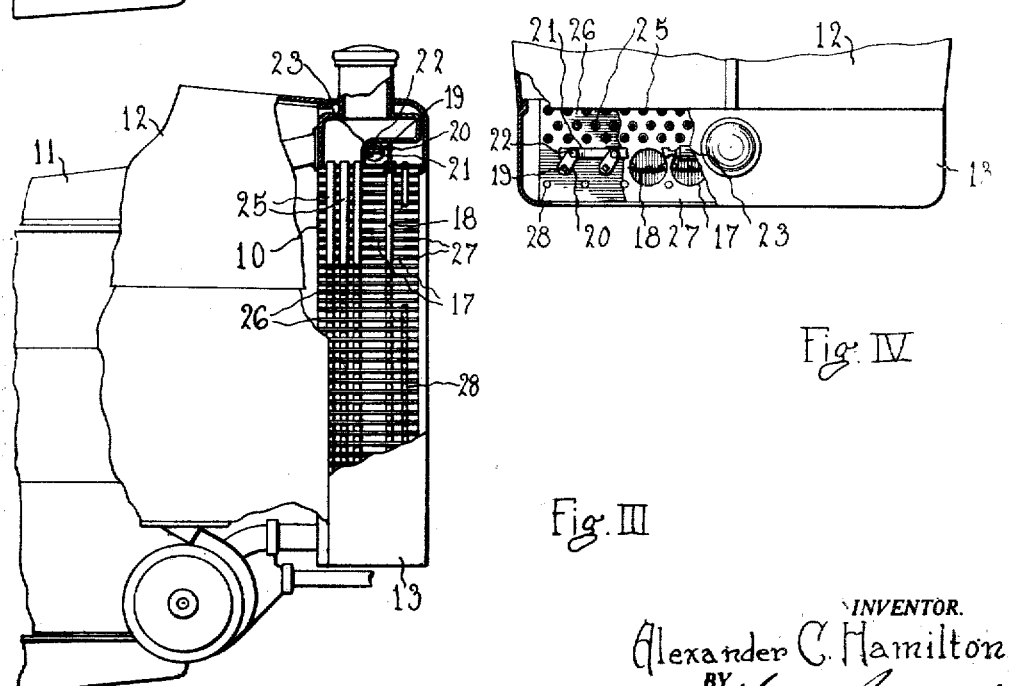
Fig. III
Fig. IV
INVENTOR.
Alexander C. Hamilton
BY
ATTORNEY.

A. C. HAMILTON.
RADIATOR FOR MOTOR VEHICLES.
APPLICATION FILED APR. 17, 1918.
1,352,190.
Patented Sept. 7, 1920.
2 SHEETS—SHEET 2.
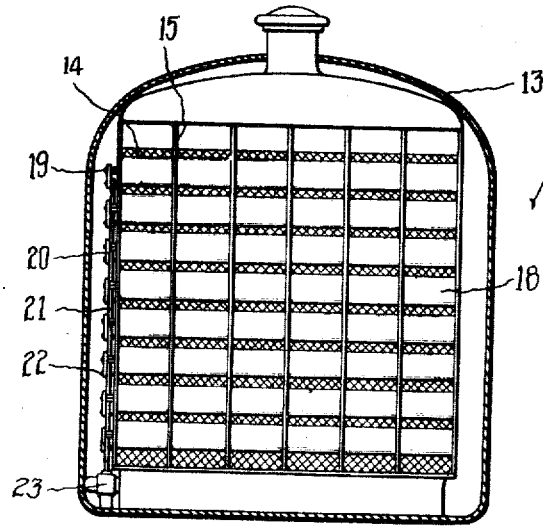
*Fig. V*
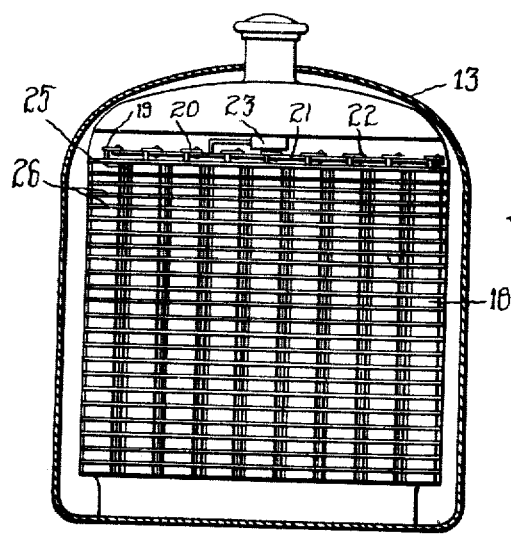
*Fig. VI*
Inventor
Alexander C. Hamilton
By
Attorney

UNITED STATES PATENT OFFICE.

ALEXANDER C. HAMILTON, OF PONTIAC, MICHIGAN, ASSIGNOR TO GENERAL MOTORS CORPORATION, OF DETROIT, MICHIGAN, A CORPORATION OF DELAWARE.

RADIATOR FOR MOTOR-VEHICLES.

1,352,190.  Specification of Letters Patent.  Patented Sept. 7, 1920.

Application filed April 17, 1918. Serial No. 229,000.

*To all whom it may concern:*

Be it known that I, ALEXANDER C. HAMILTON, a citizen of the United States, and resident of Pontiac, Oakland county, State of Michigan, have invented certain new and useful Improvements in Radiators for Motor-Vehicles, of which the following is a specification.

The invention relates to improvements in motor vehicles and more particularly to radiators therefor.

It is well known in the construction of motor vehicles to provide a radiator, preferably at the extreme front of the vehicle body, for containing a tempering fluid for the engine, and operatively connected to the engine whereby a circulation is maintained through the engine jacket and radiator for cooling purposes.

It is also well known in the art to cover the front of the radiator proper with a flap or an arrangement of shutters, which may be operated to form a shield in front of the radiator and protect the same from the extreme cooling effects or from actual freezing during the colder weather in climates where low temperatures occur. However, such flaps or shutter arrangements so far have been mounted in exposed positions and in many instances detract from the neat and pleasing appearance of the radiator, and particularly with the shutter form of protective device the individual blades forming the shutter, if they happen to be struck a slight blow, as in a minor collision, or struck by a flying stone or other obstruction, are liable to be bent and rendered inoperative, or they are required to be made of sufficiently heavy material to withstand any ordinary impact or wind pressure.

The present invention seeks to overcome these difficulties and consists essentially of a plurality of concealed shutter blades preferably arranged in rear of a front grid, which may, if desired, form a part of the radiator core, such as the fins, whereby the customary and neat appearance of the radiator is maintained, the shutter blades may be made of comparatively light material, are effectively protected from any slight blows or collisions, the manufacture and mounting of the same may be inexpensive and readily accomplished as a part of the radiator core and be completely incased by the customary outer casing of the radiator.

These and other objects will more clearly appear from the following description taken in connection with the accompanying drawings, which form a part of this specification and in which:

Figure 1 is a side elevation of the forward part of a motor vehicle showing the engine hood and radiator casing and radiator core partly broken away and in section to show the shutter mounting therein.

Fig. 2 is a plan view of the invention as shown in Fig. 1 with the hood and radiator casing and radiator core partly broken away and in section to show the mounting of the shutter blades as applied to the cellular type of radiator.

Figs. 3 and 4 are views similar to Figs. 1 and 2 showing the invention applied to the fin type of radiator.

Fig. 5 is a view showing the form of radiator shown in Figs. 1 and 2 in front elevation, the front plate being removed.

Fig. 6 is a view showing the form of radiator shown in Figs. 3 and 4 in front elevation, the front plate thereof being removed.

Like numerals of reference indicate similar parts throughout the views.

Referring particularly to Figs. 1 and 2, 10 is the radiator core of any desired cellular type and operatively connected in the usual manner with the engine water jacket 11, the engine being covered as customary by the hood 12 and the radiator core being covered as customary by the casing 13.

The radiator core 10 is preferably built up of the vertically arranged sections 14, between each of which is arranged a division plate 15, said division plates being preferably extended forwardly as at 16 and, with the exception of the end ones, having the circular openings 17 therethrough at intervals throughout the entire height thereof, the openings in the successive plates being in alinement.

Shutter blades 18 are arranged across the radiator core, one blade in each set of holes. The shutter blades 18 at each end thereof are provided with suitable trunnions 19, arranged in corresponding orifices in the end plates of the radiator core, whereby each shutter blade may be rotated.

The shutter blades are interconnected to be operated simultaneously as by the crank arms 20, fixedly secured at their inner ends to the trunnions 19 extending at one side of the radiator core, said crank arms being interconnected as by a rod 21 pivoted to each of the crank arms as at 22, and it will be understood that as the connecting rod 21 is moved vertically, the several shutter blades will be simultaneously rotated.

The rod 21 may be operated in any desired manner, as by any convenient arrangement of manually operated levers, or by an automatic device such as any of the well known forms of thermostatic elements, arranged as at 23 and influenced by the temperature of the tempering fluid contained within the radiator core, so that when the water or other fluid within the radiator core becomes heated above a predetermined degree. the thermostatic element arranged as at 23 will expand and move the rod 21 vertically and rotate the shutter blades to their open position.

The entire assembly of radiator core and shutter blades as described is preferably covered by a front plate 24, which may be stamped out with any conventional or ornamental design and secured over the outer edges of the division plates 15, and preferably within the proper radiator casing 13.

In Figs. 3 and 4 the invention is shown applied to the "fin" type of radiator, and wherein the radiator core 10 is shown connected to the engine jacket 11, the engine being covered by the hood 12 and the radiator core by the casing 13 as usual.

The radiator core 10 comprises the vertically arranged tubes 25 having the horizontally arranged fins or plates 26 through which the tubes extend as customary, said plates extending outwardly in front of the tubes as at 27 and adjacent the outer ends thereof being tied together as by rods 28.

The radiator fins or plates 27 have the sets of circular openings 17 therethrough and in which the shutter blades 18 are mounted in a manner exactly similar to that described with reference to the blades in Figs. 1 and 2, the blades, however, being vertically arranged instead of horizontal as in Figs. 1 and 2 and the operating rod 21 being arranged as shown along the top of the radiator core and connected with a thermostatic element 23, which will be influenced by the temperature of the fluid within the radiator core and operate as described with reference to Figs. 1 and 2.

It will be understood from the drawings and description that the shutter blades will be entirely concealed within the radiator core, and further that the front of the radiator will present the customary neat and regular appearance, especially in summer weather if the radiator shutters are desired to be left open at all times and the connection therewith with any manual or automatic operating means is arranged or set to retain the shutters in their open position at all times. Furthermore, the radiator division plates or fins may be readily stamped out to provide a mounting and bearing for the radiator shutters, and the plates or fins thus extended with the radiator shutters arranged therein will not only operate as an additional radiating element when desired, but will further constitute a reinforcement and protection for the radiator core proper.

It will also be understood that the end or top plate, as the case may be, in which one set of trunnions of the shutter blades are mounted, may be readily exposed by the removal of the regular radiator casing, and it will thus not be objectionable to have bolts or other fastening means for the end plates whereby inspection or removal of any of the parts for repairs may be readily and quickly accomplished, and again effectually covered by the regular radiator casing to present the customary neat appearance.

It will be obvious to those skilled in the art that many modifications and changes may be made without departing from the scope of the invention.

Having thus described my invention, what I claim and desire to secure by Letters Patent is:

1. In a radiator for motor vehicles, a radiator core; a plurality of plates extending edgewise outwardly from said core; and means located intermediate the outer ends of said plates and said radiator core for controlling the passage of air through the radiator.

2. In a radiator for motor vehicles, a radiator core; a plurality of plates extending edgewise from said core; a perforated front plate extending across the forward and open end of the radiator; and means located intermediate said front plate and said core for controlling the flow of air through the radiator.

3. In a radiator for motor vehicles, a radiator core; a plurality of plates arranged edgewise relative to said core and extending outwardly therefrom in a forward direction; and a plurality of pivotally supported oscillating shutter blades located within openings provided for them in said plates, and between the forward ends thereof and said core, to thereby control the flow of air through the radiator.

4. In a radiator for motor vehicles, a radiator core; a plurality of pivotally supported oscillating shutter blades located in front of said core; and a plurality of plates extending edgewise from said core and outwardly therefrom in a forward direction, and the extremities of which plates lie beyond said shutter blades.

5. A radiator for motor vehicles having a plurality of plates with openings therethrough and extending edgewise outwardly therefrom, and shutter blades arranged in said openings to control the passage of air through said radiator.

6. A radiator for motor vehicles having a plurality of transversely arranged radiating-fin plates with circular openings therethrough to form cylindrical passages, and shutters mounted in said passages to control the passage of air through said radiator.

7. A radiator comprising a core having plates projecting therefrom with circular openings therethrough, end plates secured to said radiator and having bearings orifices therethrough in axial alinement with the openings in said plates, shutters in said openings and having end trunnions passing through said orifices, and means operatively connecting certain of said trunnions to coincidentally rotate said shutters.

In testimony whereof I affix my signature.

A. C. HAMILTON.